March 25, 1924.
P. L. BLISS
1,487,710
COMBINED REFRIGERATOR AND ICE CREAM FREEZER
Filed Jan. 27, 1920
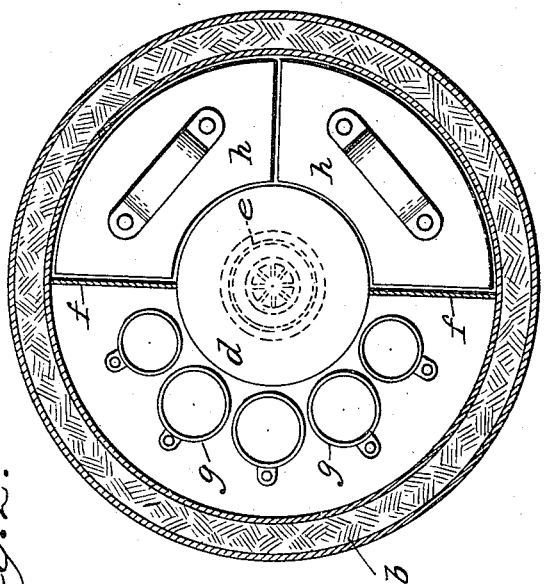
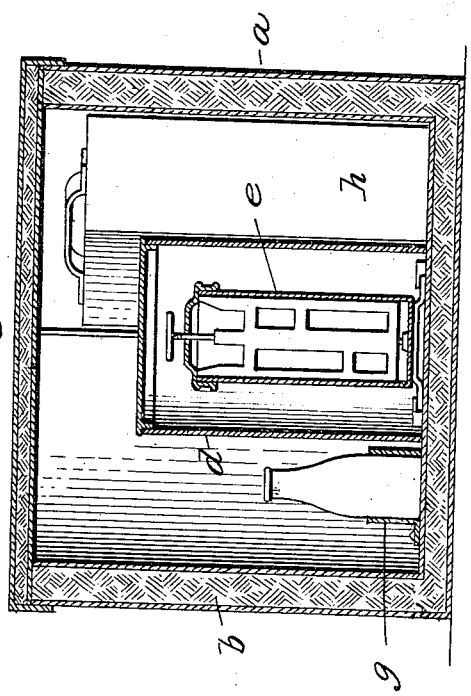
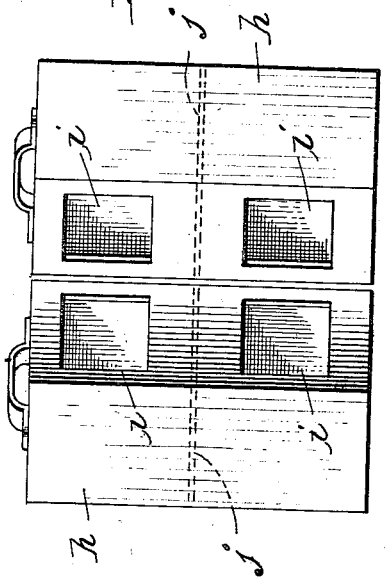
Inventor
Porter L. Bliss
By Davis & Davis
Attorneys Patented Mar. 25, 1924.

1,487,710

UNITED STATES PATENT OFFICE.

PORTER L. BLISS, OF SAN FRANCISCO, CALIFORNIA.

COMBINED REFRIGERATOR AND ICE-CREAM FREEZER.

Application filed January 27, 1920. Serial No. 354,455.

*To all whom it may concern:*

Be it known that I, PORTER L. BLISS, a citizen of the United States of America, and a resident of San Francisco, county of San Francisco, and State of California, have invented certain new and useful Improvements in Combined Refrigerators and Ice-Cream Freezers, of which the following is a full and clear specification.

The object of this invention is to provide a simple, compact, specially-insulated, portable combined refrigerator and ice cream freezer, especially adapted for use in automobiles, yachts, etc.; and the invention consists in certain novel features of construction hereinafter described and claimed.

In the drawings—

Fig. 1 is a vertical sectional view of my apparatus;

Fig. 2 is a horizontal sectional view taken on a line just under the cover;

Fig. 3 is a perspective view of the two removable food receptacles.

Referring to the drawings annexed by reference-characters, *a* designates a cylindrical casing whose vertical wall and whose bottom wall are insulated, i. e., packed with a continuous body *b* of insulating material. The cover *c* is also packed with a similar material. Any suitable insulating material may be employed, but I prefer the following special insulation: A mixture composed of 40% to 65% of diatomaceous earth, combined with 5% to 10% amorphous carbon (charcoal), 5% to 10% silicon dioxide (fine sand), 2% to 3% sodium chloride (common salt), 10% to 15% aluminum silicate (clay), and 5% to 10% calcium sulphate (gypsum), thereby producing a low-cost earthy mixture, light and friable, which has exceptional qualities for the prevention of heat penetration and the retaining of the frozen atmosphere caused by the ice and salt which is placed in the casing.

Centrally within the casing is affixed a cylindrical metal-wall ice-receptacle *d*, the wall being not provided with insulating material, so that it shall transmit the necessary low temperature throughout the refrigerator by direct frost action through said metal wall. In this way, the space around the ice-receptacle is maintained at a very low temperature, and this circular air-space virtually forms an insulating body for the ice-receptacle. Set in the ice-receptacle is an ice cream freezer *e* which may be detachably anchored by any suitable means. I prefer the type of ice cream freezer and anchoring device illustrated in my copending application Serial No. 354,456, filed January 27, 1920. It will be observed, therefore, that the ice-receptacle *d* not only forms the ice-tub or bucket for the ice cream freezer, but also forms the cooling medium for the annular space around the ice-receptacle, the ice-receptacle being unprovided with insulating material so that heat-extraction from said circular space will be direct and efficient.

The annular space around the ice-receptacle is divided by a transverse partition of metal plates *f* into two compartments. In one of these compartments, I fasten on the bottom of the refrigerator a series of rings or flanges *g* for the reception of bottles of liquid, to hold the bottles in position and prevent them being knocked about. The other half of the space is filled with a pair of segmental metal receptacles *h* whose inner concave surfaces are provided with openings *i* arranged directly adjacent to the metal wall of the receptacle *d*, so that a direct refrigerating effect upon the interior of the receptacles *h* will be assured. Each of the receptacles may be divided into an upper and lower compartment by means of a horizontal partition *j*, or they may be divided in any other suitable manner. The shape of each of the receptacles *h* ensures them being held in proper position, against the ice-receptacle, while being transported on an automobile or otherwise.

The nature and scope of the invention having been thus indicated and its preferred embodiment having been specifically described, what is claimed as new is:

In a portable refrigerator and ice cream freezer, an insulated casing, a smaller metal wall ice-receptacle anchored centrally therein to thereby form an annular article-holding space around the ice-receptacle within the insulated casing, and a metal food-receptacle shaped to fit said annular space having a side adjacent the metal wall of the ice-receptacle provided with an opening, an ice cream freezer being wholly enclosed within said ice-receptacle, and a cover being provided to cover the casing and thus enclose the ice-receptacle and the freezer.

In testimony whereof I hereunto affix my signature.

PORTER L. BLISS.

Witnesses:
 E. P. SCHMIDT,
 GEO. L. STEWART.